US008525800B2

(12) United States Patent
Kao et al.

(10) Patent No.: US 8,525,800 B2
(45) Date of Patent: Sep. 3, 2013

(54) METHOD OF OPERATING HANDHELD ELECTRONIC DEVICE AND TOUCH INTERFACE APPARATUS AND STORAGE MEDIUM USING THE SAME

(75) Inventors: Yih-Feng Kao, Taoyuan County (TW); Chun-Yao Hou, Taoyuan County (TW); Hui-Wen Wang, Taoyuan County (TW); Fu-Chiang Chou, Taoyuan County (TW); Chin-Chung Shih, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 801 days.

(21) Appl. No.: 12/340,745

(22) Filed: Dec. 22, 2008

(65) Prior Publication Data
US 2009/0167714 A1 Jul. 2, 2009

(30) Foreign Application Priority Data
Dec. 31, 2007 (TW) ................................ 96151527 A

(51) Int. Cl.
G06F 3/041 (2006.01)
(52) U.S. Cl.
USPC ........................................................ 345/173
(58) Field of Classification Search
None
See application file for complete search history.

(56) References Cited

U.S. PATENT DOCUMENTS

| 6,359,572 B1* | 3/2002 | Vale ................................ 341/23 |
| 2006/0033724 A1 | 2/2006 | Chaudhri et al. |
| 2007/0130523 A1 | 6/2007 | Ku et al. |
| 2008/0119237 A1* | 5/2008 | Kim .............................. 455/566 |

FOREIGN PATENT DOCUMENTS

| EP | 1443490 | 12/2003 |
| EP | 1923778 | 11/2007 |

OTHER PUBLICATIONS

"Office Action of Taiwan Counterpart Application", issued on Mar. 11, 2011, p. 1-p. 4, in which the listed references were cited.
"Search Report of European counterpart application", issued on Apr. 17, 2009, p. 1-p. 7.

* cited by examiner

Primary Examiner — Jason Olson
(74) Attorney, Agent, or Firm — Jianq Chyun IP Office

(57) ABSTRACT

A method of operating a handheld electronic device and a touch interface apparatus and a storage medium using the same are provided. In this method, an operating interface displayed on a touch screen of the handheld electronic device is used to operate a function module of the handheld electronic device. First, the function module of the handheld electronic device is activated to display a user interface corresponding to the function module on the touch screen. Next, an operating function of the function module is activated, so as to display a corresponding operating interface on the touch screen. In the meantime, the user interface of the function module is reduced simultaneously and displayed on an area of the touch screen excluding the operating interface. Accordingly, a convenient operating interface is provided for the user to operate while the content of original displayed frame remains.

18 Claims, 5 Drawing Sheets

METHOD OF OPERATING HANDHELD ELECTRONIC DEVICE AND TOUCH INTERFACE APPARATUS AND STORAGE MEDIUM USING THE SAME

CROSS-REFERENCE TO RELATED APPLICATION

This application claims the priority benefit of Taiwan application serial no. 96151527, filed on Dec. 31, 2007. The entirety of the above-mentioned patent application is hereby incorporated by reference herein and made a part of this specification.

BACKGROUND OF THE APPLICATION

1. Field of the Application

The present application relates to a method of operating a handheld electronic device. More specifically, the present application relates to a method of operating a handheld electronic device using a touch operating interface.

2. Description of Related Art

To keep up with the bustling pace of modern human life, a variety of readily portable and compact handheld electronic devices have been developed continuously. Take a personal digital assistant (PDA) or a PDA phone as an example, it is not only equipped with all the functions a traditional communication device has, but it also allows users to achieve purposes such as writing documents, receiving and sending e-mails, surfing the internet or using instant message software for communication through the built-in Windows operating system therein. In other words, the handheld electronic device not only can be used for making phone calls, but it also has all kinds of diversified functions as a small personal computer. To the efficiency-oriented modern people, the handheld electronic device has become one of the indispensable tools in life.

However, to meet the requirement of a light, thin, and compact handheld electronic device, the volume of the device is rather limited. If a screen and a keypad are both disposed on the device, the screen size has to be reduced. In order to dispose a larger screen in the limited space, a touch screen has been developed recently. By integrating the keypad into the screen as an input interface of the handheld electronic device, the cost of and the area occupied by a traditional keypad are saved.

The operation of the touch screen has an advantage of being simple and intuitive in comparison with the traditional keypad input. When comparing with the traditional keypad, the user has to refer to the display frame on the screen while pressing the keypad to complete operating actions such as inputting texts or switching menus when operating the electronic device with the traditional keypad. However, if the touch screen is applied in the electronic device, the user only needs to select with a stylus or press directly with a finger to execute various types of operating actions on the screen. As described above, the touch screen is substantially a more convenient input method.

The conventional handheld electronic device applies the touch screen with a video graphic array (VGA) resolution, and disposes hardware buttons such as an answer button, a hang-up button, and a navigation button (i.e., a navigation button with five directions). Nevertheless, the disposition of these hardware buttons causes the handheld electronic device to over-length and is inconvenient for the user to carry around. If the handheld electronic device applies the touch screen with a higher resolution of wide video graphic array (WVGA), then the issue of disposing the hardware buttons is further exposed as the length of the touch screen increases.

SUMMARY OF THE APPLICATION

According to the foregoing description, the present application provides a touch interface apparatus that displays a frame of a function module through a user interface, and reduces the size of the user interface so as to add in an operating interface provided for a user to operate when an operating function of the function module is activated.

The present application provides a method of operating a handheld electronic device using a touch operating interface. Herein, hardware buttons, such as a navigation button, are integrated into a touch screen and a user interface of a function module is appropriately reduced, so that a user can operate the handheld electronic device conveniently.

To achieve the forgoing objects, a method of operating a handheld electronic device with a touch operating interface is provided. The method is suitable for using the operating interface displayed on a touch screen of the handheld electronic device to operate a function module of the handheld electronic device. First, the function module of the handheld electronic device is initiated and the user interface of the function module is displayed on the touch screen, in which the user interface has a first size. Next, an operating function of the function module is activated, and the operating interface is displayed on the touch screen. Moreover, the user interface of the function module is reduced and the reduced user interface is displayed on an area of the touch screen excluding the operating interface, in which the reduced user interface has a second size.

In one embodiment of the present application, the step of displaying the operating interface on the touch screen comprises displaying the operating interface on one side of the touch screen and displaying the reduced user interface on the other side of the touch screen. Wherein, the step comprises displaying the operating interface on a lower portion of the touch screen and displaying the reduced user interface on an upper portion of the touch screen.

In one embodiment of the present application, the method of operating the handheld electronic device using the operating interface further comprises receiving a first key input of the operating interface and executing an operating action corresponding to the function module, or receiving a second key input of the operating interface to switch the operating interface.

In one embodiment of the present application, the user interface of the function module comprises a list page, and the list page comprises a plurality of data items.

In one embodiment of the present application, the step of reducing the user interface of the function module comprises reducing each of the data items on the list page proportionally, so the size of the reduced data items equals the second size.

In one embodiment of the present application, the user interface of the function module further comprises a status bar, and the step of reducing the user interface of the function module comprises reducing each of the data items on the list page proportionally, so the size of the reduced data items plus the size of the status bar equals the second size.

In one embodiment of the present application, the list page comprises a function menu, a song menu, a video menu, a file list, or a contact list.

The present application further provides a touch interface apparatus to operate a function module of a handheld electronic device. The touch interface apparatus comprises a user interface and an operating interface. The user interface is used to display a function module frame on a touch screen of the handheld electronic device when the function module of the handheld electronic device is activated. The operating interface is displayed on the touch screen and provided to the user for operating the operating function of the function module when the operating function of the function module is activated. Wherein, the user interface has a first size before the operating function of the function module is activated. Moreover, the user interface is reduced to a second size when the operating function of the function module is activated, and the user interface is displayed on an area of the touch screen excluding the operating interface.

In one embodiment of the present application, the first size has a wide video graphic array (WVGA) resolution, and the second size has a video graphic array (VGA) resolution.

In one embodiment of the present application, the operating interface comprises one or a combination of a navigation button, a confirmation button, and a screen button. Meanwhile, the operating interface comprises a multimedia player interface that has one or a combination of a play button, a pause button, a stop button, a fast-forward button, and a rewind button. Furthermore, the operating interface comprises one or a combination of an English alphabet keypad, a Chinese phonetic symbol keypad, a numeric keypad, a T9 keypad, and a 20 key keypad.

In one embodiment of the present application, the handheld electronic device comprises a personal digital assistant (PDA) or a PDA phone.

The present application further provides a storage medium that records a computer-readable priority approval program, so as to execute the aforementioned method of operating a handheld electronic device using a touch operating interface.

In the present application, an operating interface is disposed on a touch screen to execute a corresponding operating action. Wherein, when a user needs to operate a certain function module of the handheld electronic device, a corresponding operating interface is displayed on the touch screen and a size of a user interface of a function module is reduced appropriately, so that the user can browse data items of the function module clearly and operate the operating interface.

To make the above and other features and advantages of the present application more comprehensible, several embodiments accompanied with figures are detailed as follows.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF EMBODIMENTS

Under the condition of a handheld electronic device with a lengthened screen, an operating interface, such as a navigation button, is disposed in the lengthened area to replace traditional hardware buttons so as to reduce the volume of the handheld electronic device. At this time, as the operating interface occupies a portion of screen space and covers a frame originally displayed on the screen, this frame is to be modified appropriately, such that the user may browse the data in the original frame and operate the handheld electronic device with the operating interface. Accordingly, the present application provides a touch interface apparatus and a method of operating the handheld electronic device based on the above concept. In order to make the present application more comprehensible, embodiments are described below as the examples to prove that the application can actually be realized.

Figure 1:
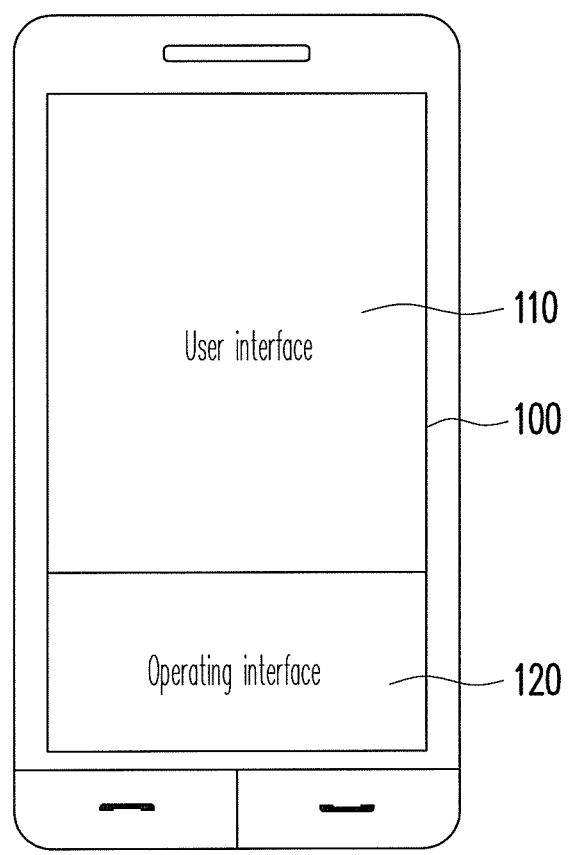
FIG. 1 is a block diagram of a touch interface apparatus according to one embodiment of the present application.

FIG. 1 is a block diagram of a touch interface apparatus according to one embodiment of the present application. Referring to FIG. 1, a touch interface apparatus 100 in the present embodiment is suitable for disposing in a handheld electronic device, such as a personal digital assistant (PDA) or a PDA phone, to operate a function module of the handheld electronic device. The touch interface apparatus 100 comprises a user interface 110 and an operating interface 120, and the functions thereof are as the following.

The user interface 110 is used to display a frame of the function module on a touch screen of the handheld electronic device when the function module of the handheld electronic device is activated. The operating interface 120 is displayed on the touch screen and provided for the user to operate when an operating function of the function module is activated.

It should be noted that in the present embodiment, when the operating function of the function module is not activated, the touch screen only displays the user interface 110 and retains a largest frame to be viewed by the user. Once the user needs to operate the function module displayed on the user interface 110, the operating interface 120 would be displayed on the touch screen. As the operating interface 120 occupies a portion of display area of the screen, a size of the original user interface 110 has to be changed. In order to retain the information displayed on the user interface 110, the present embodiment applies a proportional reduction method to display the user interface 110 on an area of the touch screen excluding the operating interface 120. As for how the touch interface apparatus 100 in the present embodiment changes the user interface 110 and the operating interface 120 accordingly based on the operating action of the user, another embodiment is used for a detailed illustration.

Figure 2:
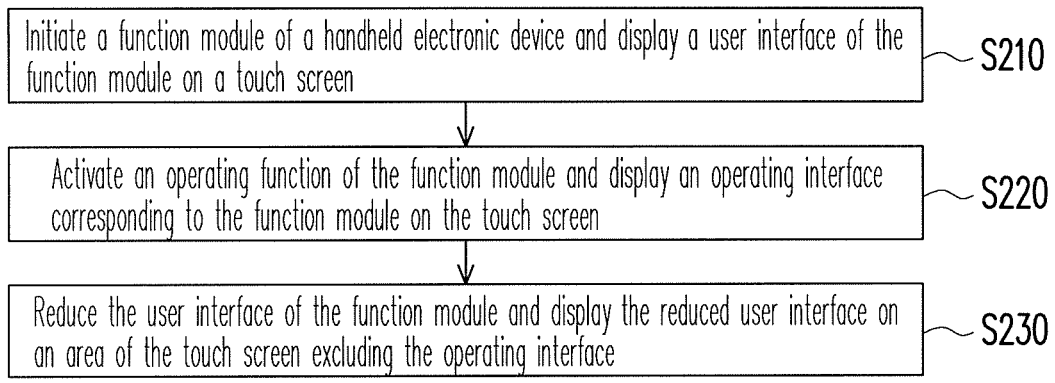
FIG. 2 is a flowchart illustrating a method of operating a handheld electronic device with a touch operating interface according to one embodiment of the present application.

FIG. 2 is a flowchart illustrating a method of operating a handheld electronic device with a touch operating interface according to one embodiment of the present application. Referring to FIG. 2, the present embodiment is suitable for displaying the operating interface on a touch screen of the handheld electronic device, and providing the user to operate the handheld electronic device using this operating interface. Wherein, the handheld electronic device is, for example, a handheld electronic device comprising a touch screen, such as a PDA, and a PDA phone, etc. The following illustrates the detailed process of the operating method in the present embodiment.

First, a function module of the handheld electronic device is initiated, and a user interface of this function module is displayed on the touch screen (step S210). Moreover, the user interface has a first size. Here, the aforementioned function module is, for example, a phone book function, a multimedia player function, or a communication function included in an ordinary handheld electronic device, and is not limited thereto. Furthermore, the user interface comprises a status bar and a list page. The list page is, for example, a function menu, a song menu, a video menu, a file list, or a contact list, and comprises a plurality of data items.

Figure 3:
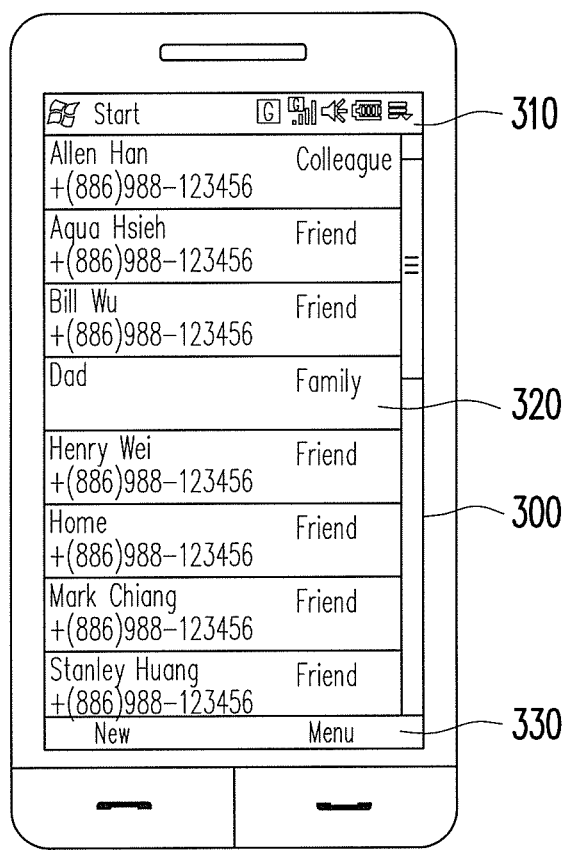
FIG. 3 is a user interface of a function module according to one embodiment of the present application.

For example, FIG. 3 is a user interface of a function module according to one embodiment of the present application. Referring to FIG. 3, the present embodiment uses a phone book function as an example. When the phone book function of a handheld electronic device is activated, a corresponding user interface 300 having a first size is then displayed on a touch screen. In addition to a status bar 310 on an upper portion and a menu bar 330 on a lower portion, the user interface 300 also displays a contact list 320 on a middle portion. The contact list 320 lists a plurality of data items, and each of the data items displays a name and a phone number of a contact.

When the user browses the data items in the user interface and desires to perform a corresponding operation, he/she can activate an operating function of the function module. At this moment, the handheld electronic device displays an operating interface corresponding to the function module on the touch screen (step S220). Here, the handheld electronic device displays different operating interface on the touch screen according to different function modules. For instance, if a phone book function is activated, buttons such as a navigation button, a confirmation button, or a screen button are displayed for a user to browse a contact list. If a multimedia player function is activated, then buttons such as a play button, a pause button, a stop button, a fast-forward button, or a rewind button are displayed for the user to control the playing of multimedia files. If a text message editing function is activated, keypads such as an English alphabet keypad, a Chinese phonetic symbol keypad, a numeric keypad, a T9 keypad, or a 20 key keypad are displayed for the user to input texts.

When displaying the operating interface, a size of the originally displayed user interface has to be compressed. In order to retain the content originally displayed by the user interface, the handheld electronic device then reduces the original user interface and displays the reduced user interface on an area of the touch screen excluding the operating interface (step S230), in which the reduced user interface has a second size. Wherein, the step of reducing the user interface of the function module comprises reducing the data items on a list page proportionally, such that the numbers of the data items is not changed, and the size of the reduced data items plus the size of the status bar equals the second size.

Figure 4:
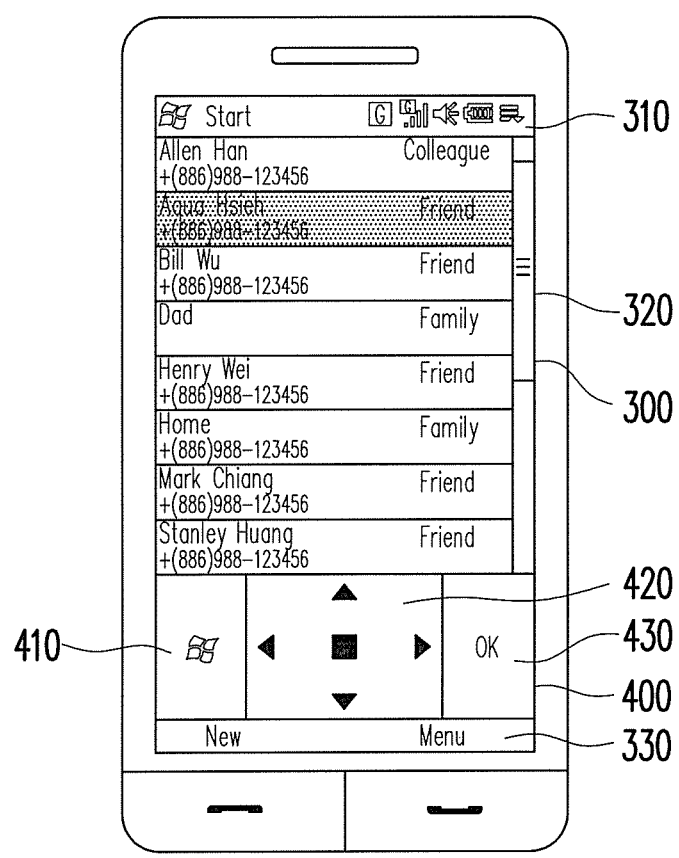
FIG. 4 is a schematic diagram of operating a handheld electronic device with a touch operating interface according to one embodiment of the present application.

More specifically, the operating interface is, for example, displayed on one side of the touch screen, and the reduced user interface of the function module is displayed on the other side of the touch screen. For example, FIG. 4 is a schematic diagram of operating a handheld electronic device with a touch operating interface according to one embodiment of the present application. Referring to FIG. 4, the present embodiment also uses the phone book function in FIG. 3 as an example. When the phone book function of the handheld electronic device is activated, a browsing interface 400 is displayed on a lower portion of the touch screen of the handheld electronic device. Wherein, the browsing interface 400 comprises a screen button 410, a navigation button 420, and a confirmation button 430. On the other hand, the reduced user interface 300 with the phone book function is displayed on an upper portion of the touch screen (that is, an area excluding the browsing interface 400). Wherein, each of the contact information in the contact list 320 of the user interface 300 is reduced proportionally, so that the size of the reduced contact information plus the size of the status bar 310 equals the second size.

Figure 5:
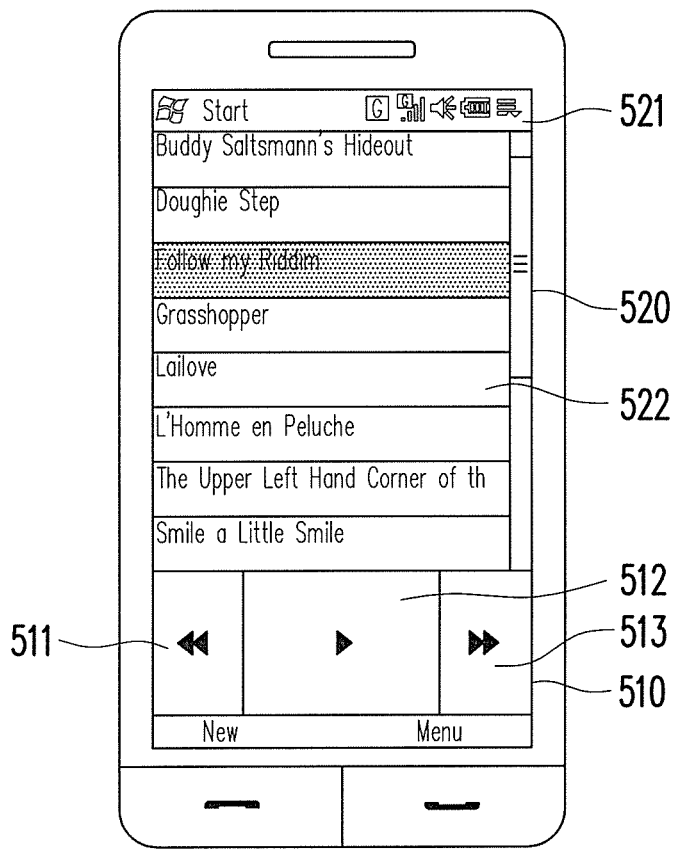
FIG. 5 is a schematic diagram of operating a handheld electronic device with a touch operating interface according to one embodiment of the present application.

FIG. 5 is a schematic diagram of operating a handheld electronic device with a touch operating interface according to one embodiment of the present application. Referring to FIG. 5, the present embodiment uses a multimedia player function as an example. When the multimedia player function of the handheld electronic device is activated, a playing interface 510 is displayed on a lower portion of the touch screen of the handheld electronic device. Wherein, the playing interface 510 comprises a rewind button 511, a play button 512, and a fast-forward button 513. On the other hand, a reduced user interface 520 with the multimedia function is displayed on an upper portion of the touch screen (that is, an area excluding the playing interface 510). Wherein, each of the song information in a song list 522 of the user interface 520 is reduced proportionally, so that the size of the reduced song information plus the size of a status bar 521 equals the second size.

It should be noted that the handheld electronic device in the present application applies, for example, the touch screen with a WVGA resolution. So, the user interface originally displayed on the touch screen also has the WVGA resolution. After the operating interface is added, the resolution of the user interface is then reduced to an ordinary VGA resolution. The advantage of this method is that currently a plurality of software and media files still apply the VGA resolution. Thus, an area of the touch screen would be blank when executing the software or playing the media files. The present application then utilizes the area frame to dispose the navigation button or the play button on this area frame, so as to operate the handheld electronic device without affecting the execution of the software or media files. It should be noted that the present embodiment is merely exemplary and do not serve as limitations to the size of the operating interface and the reduced user interface. It will be apparent to those skilled in the art that other sizes can be selected for the operating interface and the user interface according to actual needs.

Other than the method of operating the handheld electronic device by inserting the operating interface, the present application further allows a user to switch the type of operating interface to be used as needed. Another embodiment is provided as follows to illustrate in detail.

Figure 6:
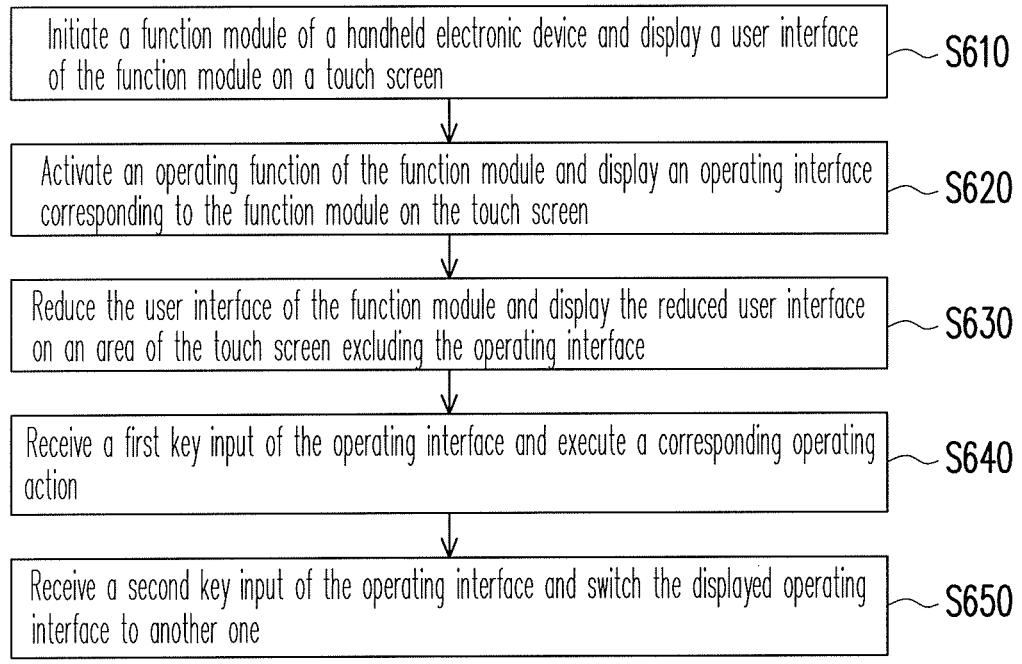
FIG. 6 is a flowchart illustrating a method of operating a handheld electronic device with a touch operating interface according to one embodiment of the present application.

FIG. 6 is a flowchart illustrating a method of operating a handheld electronic device with a touch operating interface according to one embodiment of the present application. Referring to FIG. 6, the present embodiment is suitable for displaying the operating interface on a touch screen of the handheld electronic device, and allowing a user to operate the handheld electronic device using this operating interface. Wherein, the handheld electronic device is, for example, a handheld electronic device including a touch screen, such as a PDA, and a PDA phone, etc. The following illustrates the detailed process of the operating method in the present embodiment.

First, a function module of the handheld electronic device is initiated, and a user interface of this function module is displayed on the touch screen (step S610), in which the user interface has a first size. When the user browses a plurality of data items in the user interface and desires to perform a corresponding operation, he/she can activate an operating function of the function module. At this moment, the operating interface corresponding to the function module is displayed on the touch screen (step S620). While displaying the operating interface, the handheld electronic device also reduces the original user interface of the function module and displays the reduced user interface on an area of the touch screen excluding the operating interface (S630), in which the reduced user interface has a second size. The detailed content of the above steps are all identical or similar to the steps S210-S230 in the above embodiment, and will not be described herein.

It should be noted that the present embodiment further comprises receiving a first key input of the operating interface and executing the corresponding operating action after displaying the operating interface and reducing the user interface. For example, after the handheld electronic device receives an input of a play button, the handheld electronic device plays multimedia files in the user interface. On the contrary, after the handheld electronic device receives an input of a stop button, the handheld electronic device stops playing the multimedia files.

In the meanwhile, the handheld electronic device in the present embodiment also receives a second key input from the operating interface and switches the displayed operating interface to another one (step S640). For example, when a user executes a phone book function and browses a contact list, the displayed operating interface is a navigation button, so as to allow the user to perform a browsing operation. At this time, if the user desires to edit one of the contact information, he/she may switch the operating interface from the original navigation button to an English alphabet keypad by pressing a switching button or executing a particular touch action on the original operating interface.

Figure 7:
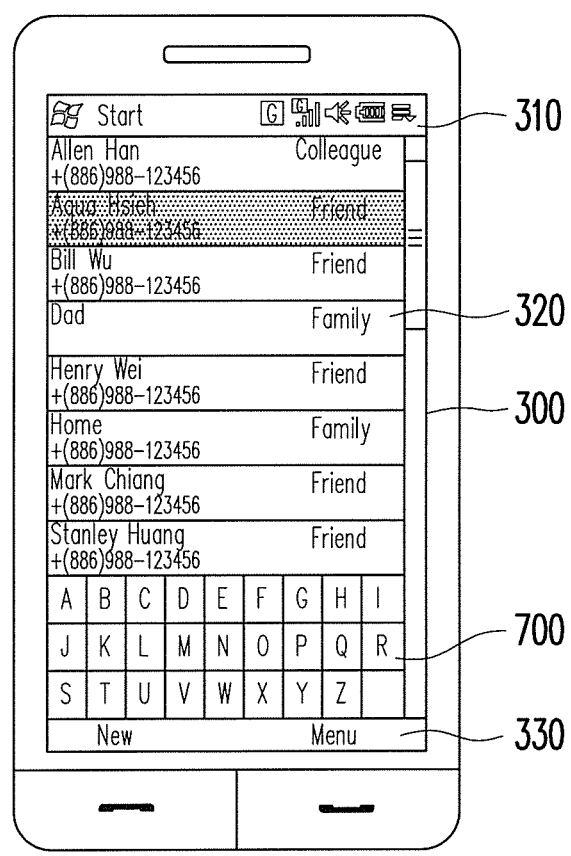
FIG. 7 is a schematic diagram of operating a handheld electronic device with a touch operating interface according to one embodiment of the present application.

FIG. 7 is a schematic diagram of operating a handheld electronic device with a touch operating interface according to one embodiment of the present application. Referring to FIG. 3, FIG. 4, and FIG. 7 simultaneously, after a phone book function of the handheld electronic device is activated, a contact list is displayed on the touch screen (as indicated in FIG. 3). Moreover, after a browsing function of the phone book is activated, a browsing interface, comprising the screen button, the navigation button, and the confirmation button, is then displayed on the lower portion of the touch screen so as to allow the user to browse the contact information. When the user desires to edit one of the contact information, he/she may switch the operating interface from the original browsing interface to an English alphabet keypad (as an English alphabet keypad 700 shown in FIG. 7) by pressing on the operating interface area and sliding to the left or the right. Therefore, convenient operation is provided since the user may switch the operating interface to perform the operation as needed.

The present application further provides a storage medium (i.e., a compact disc, a magnetic disc, and a removable disc, etc) that records a computer-readable authority certification so as to execute the aforementioned method of operating the handheld electronic device using the touch operating interface. Here, the authority certification program stored in the storage medium is generally composed of a plurality of program segments (i.e., an organization chart establishing program segment, an approval form program segment, a setting program segment, and a deployment program segment). Furthermore, a function of the program sections corresponds to the steps of the aforementioned method and the function block diagram of the touch interface apparatus described above.

In summary, the method of operating the handheld electronic device, the touch interface apparatus, and the storage medium in the present application utilize a property of a wide screen being longer than an ordinary screen, and dispose the touch operating interface on the lower portion of the screen so as to replace the traditional hardware buttons and reduce the handheld electronic device volume. Moreover, when activating the operating interface, the original screen frame is also appropriately modified so that the user may still view the same list content and the same amount of data items on the frame.

Although the present application has been described with reference to the above embodiments, it will be apparent to one of the ordinary skill in the art that modifications to the described embodiment may be made without departing from the spirit of the application. Accordingly, the scope of the application will be defined by the attached claims not by the above detailed descriptions.

What is claimed is:

1. A method of operating a handheld electronic device using a touch operating interface, the method suitable for using an operating interface displayed on a touch screen of the handheld electronic device to operate a function module of the handheld electronic device, comprising:
    activating the function module of the handheld electronic device and displaying a user interface of the function module on the touch screen, wherein the user interface has a first size;
    activating an operating function of the function module and displaying the operating interface on the touch screen;
    reducing the user interface of the function module and displaying the reduced user interface on an area of the touch screen excluding the operating interface, wherein the reduced user interface has a second size; and
    receiving a touch input comprising a slide operation on the operating interface and switching the operating interface to another operating interface with a same size as the operating interface and different key arrangement in response to receiving the touch input.

2. The method of claim 1, wherein displaying the operating interface on the touch screen comprises displaying the operating interface on a lower portion of the touch screen and displaying the reduced user interface on an upper portion of the touch screen.

3. The method of claim 1, further comprising:
    receiving a key input of the operating interface and executing an operating action corresponding to the function module.

4. The method of claim 1, wherein the user interface of the function module comprises a list page comprising a plurality of data items.

5. The method of claim 4, wherein reducing the user interface of the function module comprises reducing the plurality of data items on the list page proportionally, such that the number of data item is not changed and the size of the plurality of reduced data items equals the second size.

6. The method of claim 4, wherein
    the user interface of the function module further comprises a status bar; and
    the step of reducing the user interface of the function module comprises reducing the plurality of data items on the list page proportionally, such that the number of data item is not changed and the size of the plurality of reduced data items plus the size of the status bar equals the second size.

7. The method of claim 4, wherein the list page comprises a function menu, a song menu, a video menu, a file list, or a contact list.

8. The method of claim 1, wherein the first size has a wide video graphic array (WVGA) resolution and the second size has a video graphic array (VGA) resolution.

9. A touch interface apparatus for operating a function module of a handheld electronic device, comprising:
- a user interface, displaying a frame of the function module on a touch screen of the handheld electronic device when the function module of the handheld electronic device is activated;
- an operating interface, displayed on the touch screen to provide a user with an operating function of the function module when the operating function of the function module is activated, wherein
- the user interface comprises a first size when the operating function of the function module is not activated, and
- the user interface is reduced to a second size and displayed on an area of the touch screen excluding the operating interface when the operating function of the function module is activated, and
- the operating interface is switched to another operating interface with a same size as the operating interface and different key arrangement when receiving a touch input comprising a slide operation.

10. The touch interface apparatus of claim 9, wherein the operating interface further comprises receiving a key input and executing an operating action corresponding to the function module.

11. The touch interface apparatus of claim 9, wherein the user interface of the function module comprises a list page comprising a plurality of data items.

12. The touch interface apparatus of claim 11, wherein the plurality of data items on the list page are reduced proportionally, such that the number of data item is not changed and the size of the plurality of reduced data items equals the second size.

13. The touch interface apparatus of claim 11, wherein
the user interface of the function module further comprises a status bar; and
the plurality of data items on the list page are reduced proportionally, such that the number of data item is not changed and the size of the plurality of reduced data items plus the size of the status bar equals the second size.

14. The touch interface apparatus of claim 9, wherein the first size has a WVGA resolution and the second size has a VGA resolution.

15. The touch interface apparatus of claim 9, wherein the operating interface comprises one or a combination of a navigation button, a confirmation button, and a screen button.

16. The touch interface apparatus of claim 9, wherein the operating interface comprises a multimedia player interface, which comprises one or a combination of a play button, a pause button, a stop button, a fast-forward button, and a rewind button.

17. The touch interface apparatus of claim 9, wherein the operating interface comprises one or a combination of an English alphabet keypad, a Chinese phonetic symbol keypad, a numeric keypad, a T9 keypad, and a 20 key keypad.

18. A storage medium for storing a computer program, wherein the computer program comprises a plurality of program segments to be loaded into a computer system, such that the computer system executes the method of claim 1.

* * * * *